J. A. DORAN.
PIN FOR BROOCHES AND OTHER ARTICLES.
APPLICATION FILED FEB. 24, 1914.
1,160,149.  Patented Nov. 16, 1915.
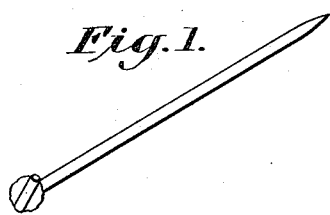
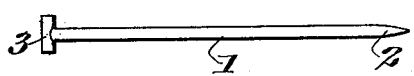
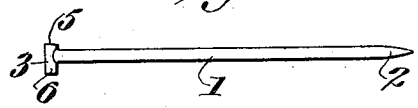
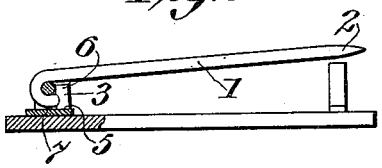
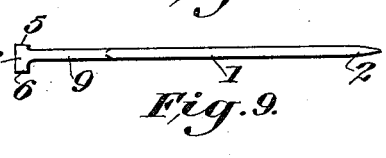
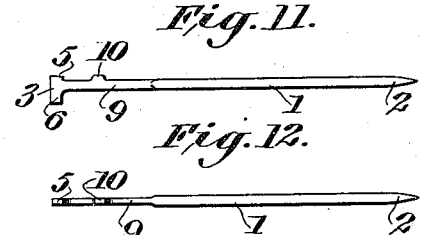
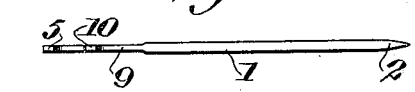
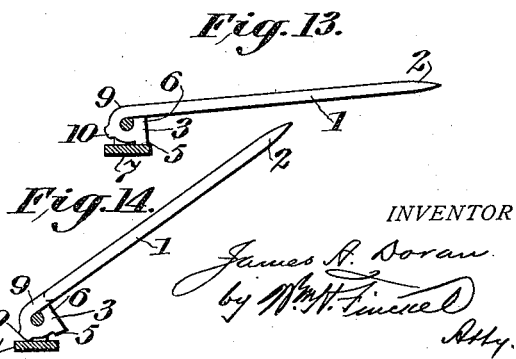
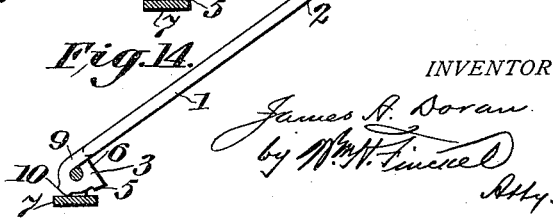
WITNESSES  INVENTOR

UNITED STATES PATENT OFFICE.

JAMES A. DORAN, OF PROVIDENCE, RHODE ISLAND.

PIN FOR BROOCHES AND OTHER ARTICLES.

1,160,149.  Specification of Letters Patent.  Patented Nov. 16, 1915.

Application filed February 24, 1914. Serial No. 820,683.

*To all whom it may concern:*

Be it known that I, JAMES A. DORAN, a citizen of the United States, residing at Providence, in the county of Providence and State of Rhode Island, have invented a certain new and useful Improvement in Pins for Brooches and other Articles, of which the following is a full, clear, and exact description.

The heads or eye portions of the pins or tongues for brooches and other articles of that general character, have been formed in a great variety of ways, and with different objects in view.

The present invention has for its object to construct such head or eye portions in a simple manner, and so that there shall be no diminution in strength at this most vulnerable point of the pins or tongues.

The invention broadly stated, consists in heading up the end of the wire so as to get a portion thereof standing substantially at right angles to the axis of the pin and then so modifying this cross-piece that it may be turned up toward the main portion of the pin to form the eye and provide a portion which serves as a stop which requires the development of the resiliency of the pin in order to connect it with the pin guard or catch, as I will proceed now to explain and finally claim.

In the accompanying drawings illustrating the invention, in the several figures of which like parts are similarly designated, Figure 1 is a perspective view illustrating a first operation followed in one embodiment of the invention. Fig. 2 is a side elevation of the device of this first operation. Fig. 3 is a side elevation similar to Fig. 2, but with the fins trimmed off. Fig. 4 is a side elevation showing the device shorn of part of its cross-piece, and ready to be bent up into finished form, and Fig. 5 is a side elevation showing the formed head or eye. Fig. 6 is a side elevation illustrating the finished pin tongue applied to an ordinary pin joint. Fig. 7 is a cross-section on the line A B, Fig. 5. Fig. 8 is a side elevation, Fig. 9 is a plan view, and Fig. 10 is a side elevation in finished form of a modified form of the pin tongue, wherein the head portion is flattened. Fig. 11 is a side elevation, Fig. 12 is a plan view, and Fig. 13 is an elevation in finished form and applied to a joint, showing another modification; and Fig. 14 illustrates the purpose of the back-stop constituting an added feature of the device shown in Figs. 11, 12 and 13.

In the manufacture of pins of the class herein referred to, it has always been a source of expense and trouble to secure enough metal in the head or eye to form a strong and substantial bearing point for maintaining a spring pressure when the pin is engaged in its catch. There are two methods in most common use; one of which is to form a coil in the end of the wire and flatten it, and the other is to cut out a blank from flat stock and then round and point the stem or piercing portion. In the case of the coiled construction, the coil must be flattened severely in order to secure a large head, and this results in the weakening of the pin at the juncture of its stem and head and where the greatest strain occurs in use. Where such flattened heads have been provided with a stop, bump, or projection to come into contact with the bottom of the joint in order to make the pin spring, continued use of the pin serves to round off this bump and wear it away until it is no longer effective. In the case of the pins cut from a blank of flat stock, it is to be said that the process is expensive and practically is available only on high-priced goods. Moreover, this construction has the weak point immediately adjacent the juncture of the stem and head where the pin is most vulnerable.

In carrying out the invention, I take a piece of round wire, as 1, and at some time point it, as at 2, and upset or swage the opposite end, as at 3, so as to practically make a T shaped structure. Then the fins, as 4, are removed so as to leave the main portion of the head standing and projecting from opposite sides of the pin as shown in Fig. 3, and then one side of the projecting head is cut off, as at 5, to make it shorter than the other side 6, as shown in Fig. 4, and then the thus prepared pin is bent over suitable coiling dies, so as to form an eye or head with a large, flat bearing surface to engage the brooch at the base of the pin joint, as shown in Fig. 6, and which is so far in front of the vertical center line of the eye, that it is impossible for it to have any backward movement on the brooch or base of the pin joint so as to pass under the center and lose its spring. This shorter side 5 of the head has its end finished off at a slight angle so as to take a square, flat bearing at the base of the pin joint to thereby normally support the pin stem at an angle or away from the pin guard or catch, as shown in Fig. 6, and such finish takes the place of the bump in developing the resiliency of the pin when it is being snapped into its catch. The end of the longer side 6 may be brought up against the stem of the pin, as indicated in Figs. 10, 11 and 14, but preferably a space is purposely left between these parts, as indicated in Figs. 5 and 6, so that when the pin stem is forced down, it strikes the head, and the coil acts as a spring; that is to say, there is no one point of the pin that bends, but the bending is distributed principally over the coil and only partly in the pin stem, and hence it is practically impossible for the pin to break. However, as above stated, it is within my invention to have the end of the longer side of the head touch the stem of the pin in its normally finished form. These facts will be more apparent by reference to Fig. 6, wherein the pin is mounted in an ordinary pin joint 7.

If desired, when the pin is formed of round wire, the entire inner circumference of the eye or head may be flattened as at 8, Fig. 7, so as to get a wider bearing on the pivot or rivet which would give a longer life to the pivot or rivet, and avoid the chance of wearing a groove in it, which is liable to happen when the inside of the eye is left with a curved surface.

The construction shown in Figs. 8 to 14 illustrates another way of getting a substantially circular and interiorly flattened eye, and in this instance the cross-head is formed as previously described, and then flattened as indicated at 9, particularly in Figs. 9 and 12, and then this portion is coiled up as illustrated in Fig. 10. In this construction also a back-stop 10 may be formed, the function of the back-stop being, as illustrated in Fig. 14, to prevent the pin tongue from turning backward too far. This back-stop may be swaged or upset on the round wire, or on the flattened structure.

The invention is applicable to pins for use with all styles of joints, including those where a separate pintle, rivet, or pivot is used, as well as where such pivot is integral, and also where the pivot is suspended in the head of the pin itself. It may also be used in joints of celluloid or other material than metal, as well as in metal joints.

What I claim is:—

1. A pin for brooches and other articles, comprising a stem having one of its ends swaged at right angles to the longitudinal axis of the stem to form a cross-piece projecting from opposite sides and bent to form an eye to engage a joint on the brooch or other article, said cross-piece having the end of one side projection finished to have a flat bearing at the base of the joint in front of the vertical center of the joint, and its other side projection extending toward the pin stem.

2. A pin for brooches and other articles, comprising a stem having one of its ends swaged at right angles to the longitudinal axis of the stem to form a cross-piece and bent to form an eye to engage a joint on the brooch or other article, said cross-piece adapted to engage the stem on one side and extending beyond the eye toward the brooch on the opposite side and provided with a flat bearing surface to engage the brooch in front of the vertical center of the joint to support the stem at an angle to the brooch or other article.

3. A pin for brooches and other articles, comprising a stem coiled at one of its ends to form an eye to engage a joint on the brooch or other article, said coiled end terminating in a cross-piece swaged at right angles to the longitudinal axis of the stem and projecting from opposite sides of the stem transversely to the axis of the eye and extending substantially perpendicular to the stem and terminating in flat bearing surfaces to engage respectively the pin stem and the base of the joint in front of the vertical center of the joint.

4. A pin for brooches and other articles, comprising a stem coiled at one of its ends to form an eye to engage a joint on the brooch or other article, said coiled end terminating in a cross-piece swaged at right angles to the longitudinal axis of the stem and projecting from opposite sides of said stem transversely to the axis of the eye and extending substantially perpendicular to the stem and terminating in flat bearing surfaces to engage respectively the pin stem and the base of the joint in front of the vertical center of the joint, one of the projecting sides of the cross-piece being longer than the other.

5. A pin for brooches and other articles, comprising a stem having one of its ends swaged at right angles to the longitudinal axis of the stem to form a cross-piece projecting from opposite sides of the stem, said end bent to form an eye adapted to pivotally engage a joint on the brooch or other article, said cross-piece extending substantially perpendicular to the stem and having one of its sides extending toward but not meeting the stem and its other side extending away from the stem and adapted to engage the base of the joint in front of its vertical center to support the stem at an angle above the brooch or other article.

6. A pin for brooches and other articles, comprising a stem having one of its ends swaged at right angles to the longitudinal axis of the stem to form a cross-piece projecting from opposite sides of the stem, said end coiled to form an eye to pivotally engage a joint on the brooch or other article, said cross-piece extending substantially perpendicular to the stem and engaging the stem on one side and its other side projecting beyond the eye and engaging the brooch in front of the vertical center of the joint, and a back stop on the rear of said coiled end.

In testimony whereof I have hereunto set my hand this 20th day of February A. D. 1914.

JAMES A. DORAN.

Witnesses:
 JAMES H. HIGGINS,
 EBER FORBES.